United States Patent Office 3,095,170
Patented June 25, 1963

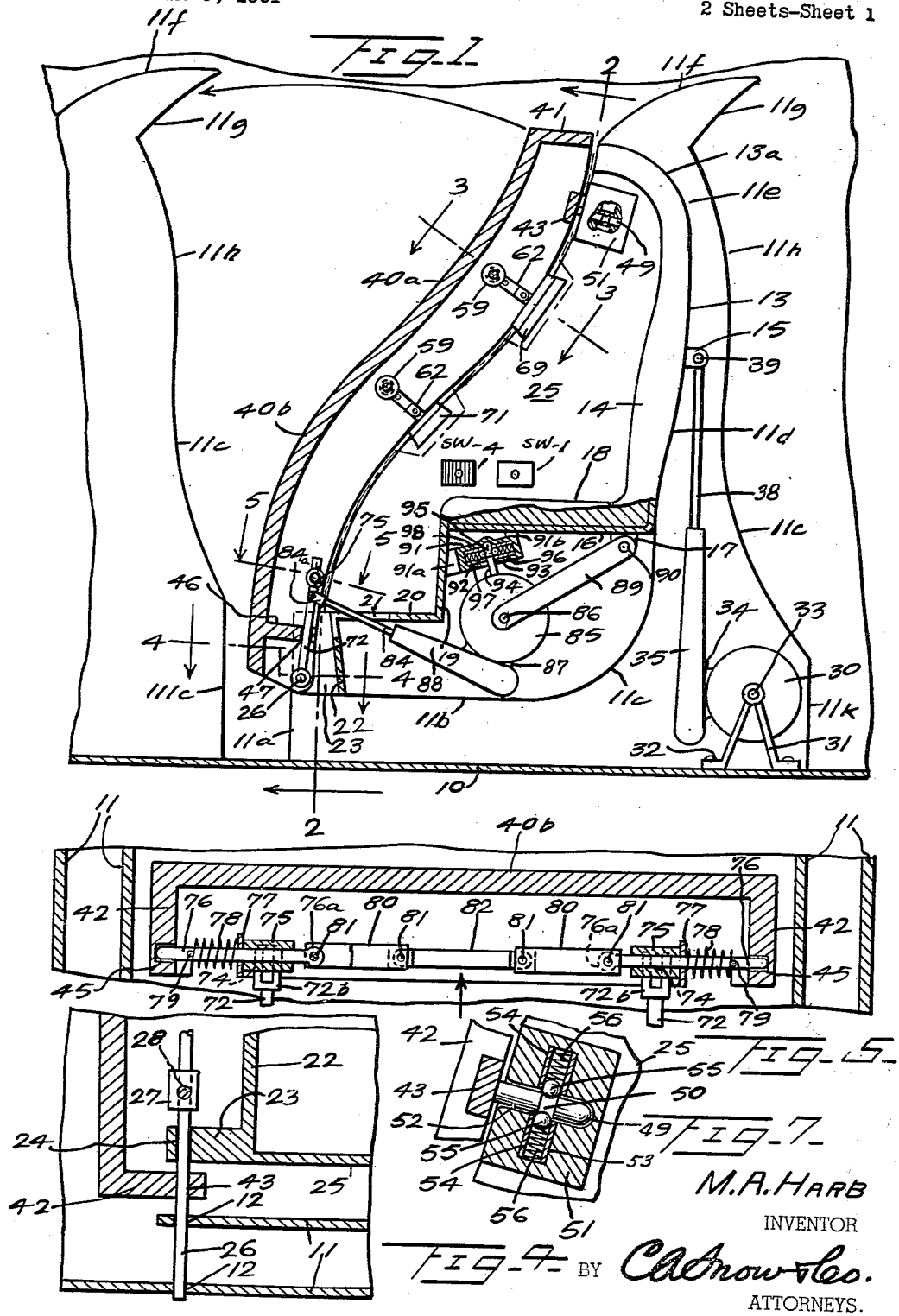

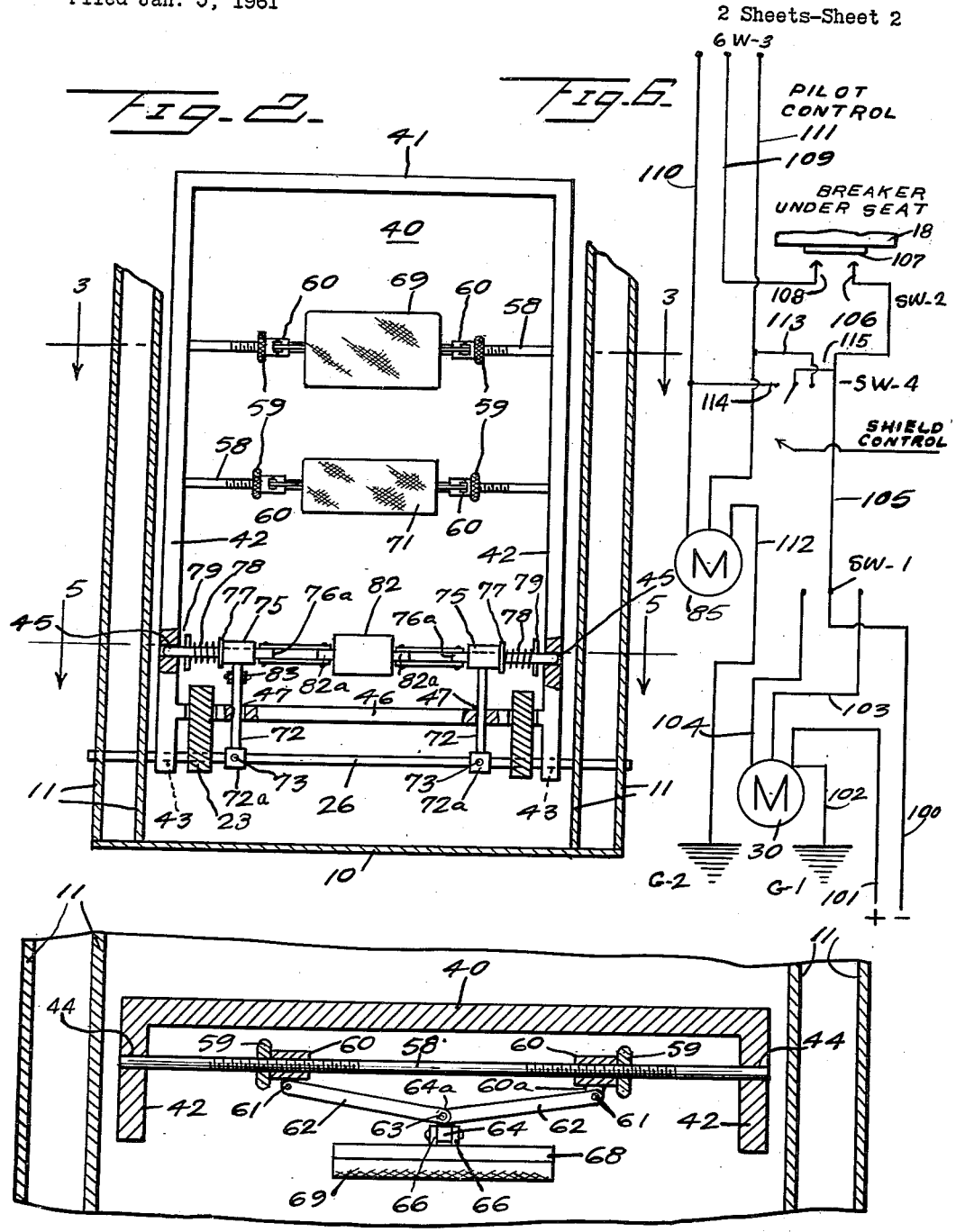

3,095,170
CRASH SEATS FOR PASSENGER PLANES
Mitchell A. Harb, P.O. Box 261, Winston Road,
Lexington, N.C.
Filed Jan. 5, 1961, Ser. No. 80,777
9 Claims. (Cl. 244—122)

This invention relates to a crash seat for use on passenger carrying airplanes.

While the crash seat according to the present invention is herein described as being primarily intended for use on airplanes, it will be understood that same may, without modification, be adapted to other types of passenger carrying vehicles, such as motor buses, motor boats and railway coaches.

The object of the present invention is to provide a crash seat and a complementary shield which will totally enclose and protect the passenger in the event of a crash due either to a faulty takeoff or a forced bad weather landing.

Another object of the present invention is to provide a crash seat and complementary shield, which latter is operable by the pilot to totally enclose the passenger when a crash landing is impending.

A further object of the present invention is to provide a crash seat and complementary shield, which latter the passenger may operate to totally enclose himself in expectation of a crash landing of the airplane.

An additional object of the present invention is to provide a crash seat and complementary shield, which latter is operable either by the pilot or the passenger to totally enclose the passenger in the event of a crash landing of the airplane, but which is not operable by the pilot to enclose an unoccupied seat.

A still further object of the present invention is to provide a crash seat and a complementary shield, which latter is operable by the pilot to totally enclose the passenger in anticipation of a crash landing and from which the passenger may readily free himself after the crash landing has occurred, or the danger of same has passed.

Still other objects, advantages and improvements will become apparent from the following specification, taken in connection with the accompanying drawings in which:

FIGURE 1 is a side elevational view, partially in section, of the crash seat and complementary shield according to the present invention, showing the shield in the passenger enclosing position.

FIG. 2 is a rear view of the complementary shield for the crash seat, taken on the line 2—2 of FIG. 1 and looking in the direction of the arrows, showing in particular the adjustable chest and knee braces and the manual means for releasing the complementary shield.

FIG. 3 is a partial sectional view, taken on the section line 3—3 of FIG. 1 and looking in the direction of the arrows, showing the adjustable feature of the chest brace on the complementary shield.

FIG. 4 is a detail sectional view, taken on the section line 4—4 of FIG. 1 and looking in the direction of the arrows, showing the pivotal mounting of the crash seat.

FIG. 5 is a detail sectional view, taken on the section line 5—5 of FIG. 1 and looking in the direction of the arrows, showing the manual means for releasing the complementary shield.

FIG. 6 is a circuit diagram showing the circuit for the dual motors for swinging the complementary shield and tilting the crash seat; and FIG. 7 is a sectional view of the latch for holding the complementary shield in the position in which it encloses the seat.

Referring now to the drawings in detail, and to FIGS. 1 and 2 in particular, the floor of an airplane is here designated at 10. At 11—11 there are shown double walls of any kind, which may be retaining walls of a seat supporting structure. The seat according to the present invention has a back 13, which is cushioned at 14, the back being curved upwardly and forwardly at 13a. The seat also includes a bottom 16, which is cushioned at 18. It will be understood that the distance from the bottom 16 to the upwardly and forwardly curved top sections 13a of the back is greater than the thigh to head measurements of persons of maximum height. The seat in addition has a foot rest 20, a back 19 between the bottom 16 and the foot rest 20, and a mounting plate 22 along the front side of the foot rest 20. The seat is further comprised in part by parallel side walls 25. At the bottom of the mounting plate 22 and the junctures of the latter with the respective side walls 25, the seat is formed on each side wall with a forwardly extending lug 23 having a hole 24 therethrough. A pivot rod 26 extends through the holes 24 in the lugs 22 on the opposite sides of the seat and through aligned holes 12—12 in the double walls 11—11 of the seat supporting structure. Collars 27 surround the pivot bar 26 on the inner sides of the lugs 23 and are held in place by radially positioned set screws 28.

The double walls 11—11 of the seat supporting structure are positioned parallel to and spaced outwardly from the side walls 25 of the seat, as shown in FIG. 4. These double walls 11—11 have vertical front ends at 11a and horizontal bottoms at 11b, which latter are rounded at their rear ends at 11c. Above these rounded rear ends 11c the walls 11—11 are contoured to correspond transversely of the body of the plane to the curved backs of the seats. These sections are curved at 11d to correspond to the backs of the seats 13 and at 11e to correspond to the upwardly and forwardly curved tops 13a of the seat. At their tops the walls 11—11 are curved upwardly and rearwardly in any desired manner at 11f. Along their backs the walls 11—11 are contoured to correspond transversely of the body of the plane and to correspond to the curvature of a complementary crash shield 40 to be later described. From the curved top sections 11f the walls 11—11 are recessed in their backs along a straight line inwardly and downwardly at 11g, and then convexly curved at 11h and concavely curved at 11i, and at their bottoms terminate in vertically positioned rear ends 11k.

A reversible electric motor 30, preferably of the "Selsyn" type, is provided for swinging the seat forwardly and rearwardly. This motor is mounted on a bracket 31, which is secured to the floor 10 of the airplane body by bolts 32. The motor has a shaft 33 and a spur gear housing 34, which latter is integrally formed with a rack gear housing 35. It will be understood that there is a spur gear train (not shown) in the spur gear housing 34, which meshes with a rack pinion (also not shown) in the rack gear housing 35. A rack 38 is reciprocable within the rack gear housing 35 and is engaged with the rack pinon within the latter and at its upper end is connected by a bolt or pin 39 to a lug 15 on the back of the seat 13.

The position of the seat shown in its forward position and the rack 38 is fully extended from the rack gear housing 35. When the seat 13 is swung to its rearward position between the side walls 11—11, the rack 38 is withdrawn within the rack gear housing 35, this housing, the spur gear housing 34, and the housing of the motor 30 all swinging as a unit in a clockwise direction around the shaft 33.

The crash shield is comprised principally by a curved plate or sheet member 40, which is concavely curved at 40a from between its top and its mid-section, and convexly curved at 40b, from its mid-section toward the bottom. The shield has a top flange 41, side flanges 42—42, and, adjacent its bottom a transverse web 46, between the side flanges 42—42. The top flange 41 of the complementary crash shield is received between the recessed sections 11g—11g of the side walls 11—11, respectively of the forward seat, the concavely curved section 40a is received between the convexly curved sections 11h—11h, and the convexly curved section 40b is received between the concavely curved sections 11i—11i, when the crash shield is swung to the forward or non-operative position, as shown by the arrow in FIG. 1. At their bottoms the side flanges 42—42 have holes 43 therein, which receive the pivot rod 26 between the lugs 23 on the seat and the innermost wall of the double walls 11—11.

Latches are provided for holding the complementary crash shield 40 in the position in which it encloses the seat, as shown in FIG. 1. These latches are comprised in part by cylindrical tongues 49 which are mounted in transversely positioned lugs 43 on the side flanges 42—42 and have semi-cylindrical grooves 50 therein. Complementary keepers are comprised by blocks 51, which are mounted on the side walls 25 of the seat. These keepers have transversely positioned bores 52 therein and right angle intersecting bores 53. The bores 52 receive the cylindrical tongues 49; the right angle bores 53 have sleeves 54 therein, balls 25 positioned within the sleeves, and coiled compression springs 56 between the balls 55 and the ends of the bores, which latter releasably hold the balls 55 in the semi-cylindrical groove 50 in the tongues.

Chest and knee braces are provided and these differ in only two respects, one being their relative positions on the crash shield 40. Rods 58 are threaded for parts of their length on the opposite sides of their mid-sections and mounted at their opposite ends in holes 44—44 in the side flanges 42—42 of the crash shield. On these rods there are slidably mounted sleeves 60—60, which have lugs 60a thereon. Lock nuts 59—59 are also mounted on the threaded rods 58, beyond the outer ends of the sleeves 60—60. Toggle levers 62—62 are connected at their outer ends by bolts 61 to the lugs 60a on the sleeves 60—60 and at their inner ends by a bolt 63 to a lug 64a on a sleeve 64. This latter sleeve is mounted between parallel ears 66—66 on a plate 68, for the chest brace, and held in place by a bolt 65. The plate 68 is covered on its front face by a pad 69. The plate 70 for the knee brace differs from the plate 68 for the chest brace only in being of lesser width. This latter plate is likewise covered by a pad 71. It will be apparent that by moving the lock nuts 59—59, either or both, inwardly, the plate 68 and the pad 69, or the plate 70 and pad 71, may be advanced outwardly; conversely, by moving the lock nuts 59—59 outwardly, either or both, the plate 68 and pad 69, or the plate 70 and pad 71, may be forced backward.

The mechanism for moving the complementary crash shield rearwardly to seat enclosing position and the mechanism for releasing same, after the crash has occurred, or the danger of same is no longer imminent, including common parts, as shown in FIGS. 2 and 5. Arms 72—72 extend through suitable holes 47 in the lower transverse web 46 on the complementary crash shield and at their lower ends are formed with cylindrical bosses 72a, which latter have axial holes therein for receiving the pivot rod 26, and are secured to the pivot rod by axially positioned set screws 73. At their upper ends the arms 72—72 are enlarged and bifurcated at 72b. These bifurcated upper ends 72b—72b of the arms 72—72 are received in parallel holes 74—74 in sleeves 75—75. The sleeves 75—75 are slidably mounted on rods 76—76, which have eyes 76a at their inner ends and at their outer ends are slidably received in holes 45—45 in the side flanges 42—42 of the complementary crash shield 40. Washers 77—77 are also slidably mounted on the rods 76—76 and abut the respective outer ends of the sleeves 75—75. The washers 77—77 are held against the sleeves 75—75 by coiled compression springs 78—78, which latter at their outer ends abut pins 79—79 positioned diametrically in holes through the rods 76—76. A presser plate 82 is positioned between the rods 76—76 and normally in alignment with same. This presser plate has ears 82a—82a at the opposite ends. Pairs of parallel links 80—80 are interposed between the presser plate 82 and the rods 76—76 and are pivotally attached to the presser plate by short bolts 81, which are positioned in aligned holes in the inner ends of the links and the ears 82a, and to the rods 76—76 by other short bolts 81, which are positioned in aligned holes in the outer ends of the links and the eyes 76a on the rods 76—76.

It will be apparent that the complementary crash shield 40 is normally locked to the pivot rod 26 by the arms 72—72. In case, however, there should be an impending crash at the same time there is a power failure, the crash shield may be unlocked from the pivot rod 26 and manually moved to the seat enclosing position. This is done by pushing on the presser plate 82, as shown by the arrow in FIG. 5. This action withdraws the rods 76—76 from the holes 45—45 in the side flanges 42—42 of the crash shield, the latter sliding through the sleeves 75—75 and against the action of the coiled compression springs 78—78. The crash shield 40 may now be freely swung on the pivot rod 26. The action would, of course, be the same if the crash shield 40 had been moved to the seat enclosing position by the motor means, to be now described, and the crash has occurred or the imminence of same has passed, and it would be desired to return the crash shield to the position where it is not in use, except that the crash shield will be swung in the opposite direction.

A second reversible electric motor 85, also preferably of the "Selsyn" type, is provided for swinging the crash shield 40 to the seat enclosing position. This motor has a shaft 86 and a spur gear housing 87 on its front end, which latter is integrally formed with a rack gear housing 88. A rack gear 84 is reciprocally mounted in the rack gear housing 87 and extends through an elongated slot 21 in the foot rest 20 and mounting plate 22. At its outer end the rack gear 84 is flattened and bifurcated at 84a and this bifurcated end receives one of the arms 72 to which it is pivotally attached by a bolt 83. The rack gear meshes with a pinion (not shown) in the rack gear housing 88 and the latter in turn meshes with a spur gear train (also not shown) in a spur gear housing 87 on one side of the motor, this spur gear train being driven from the shaft 86.

The motor 85 is swingably and releasably mounted so as not to interfere with the manual swinging of the crash shield 40 to the seat enclosing position, as previously described. The shaft 86 of the motor also functions as part of the pivotal mounting means. This pivotal mounting means is comprised by parallel arms 89, which are positioned on the opposite sides of the motor and have holes therein adjacent their lower ends which rotatably receive the shaft 86 of the motor. At their upper ends the arms 89 are pivotally connected by bolts 90 to lugs 17 on the bottom 16 of the seat.

As shown in FIGURE 1, the crash shield 40 is in its rearward position, against the seat 13, and the rack gear 84 is withdrawn within the gear housing 88. When the crash shield is moved forwardly to the position when its back is transversely aligned with the downwardly inclined and convexly and concavely curved sections 11g, 11h and 11i of the side walls of the seat immediately ahead, the rack gear 84 is extended from the rack gear housing 88. Since, however, the pivotal point of attachment, bolt 83, of the rack gear 84 to the crash shield 40 has a short radius, the extension of the rack gear 84 from the rack gear housing 88 is slight.

The releasable mounting means for the motor 85 is similar to the keeper 51 for the latch on the crash shield, as shown in FIG. 7. This mounting means is comprised in part by a block 91, which has a bore 92 therein and an intersecting hole 93 in one side wall. The block 91 has an extension flange 91a at one end, by which it is secured to the back 19 of the foot rest, and a right angle flange 91b at its other end, by which it is secured to the bottom 19 of the seat, as by welding. A rod 94 is secured to the housing of the motor 85 in any suitable manner and normally extends through the hole 93 in the side wall of the block 91. Sleeves 96 are positioned in the bore 92 on the opposite sides of the hole 93 and coiled compression springs 97—97 are enclosed by these sleeves. At their outer ends the coiled compression springs 97—97 abut the ends of the bore 92 and at their other ends balls 98—98, which normally seat in a semi-cylindrical groove 95 in the rod 94.

The circuit for the "Selsyn" motor 30, which reclines and returns the seat to normal position, and the "Selsyn" motor 85, which swings the crash shield 40, is shown in FIG. 6. A conductor 100 extends from the negative terminal of a suitable source of direct current power supply to the blade of a single pole, double throw switch SW-1. This switch is the seat control switch and is located on one of the side walls 25 of the seat. A conductor 101 extends from the positive terminal of the source of direct current power supply to one outside terminal of the motor 30. This terminal is also connected to ground at G-1 by a conductor 102. The center terminal of the motor 30 is connected to one contact of the switch SW-1 by a conductor 103 and the other outside terminal of the motor to the other contact of the switch by a conductor 104. The blade of the switch SW-1 is also connected by a conductor 105 to one contact 106 of a switch SW-2. This switch is responsive to the presence of a passenger in the seat. It is comprised by the contact 106, another contact 108, and a movable contact member 107, which latter is secured to the under side of the cushion 18 of the passenger's seat. The contact 108 of the latter switch is connected by a conductor 109 to the blade of a single pole, double throw switch SW-3, which is located in the pilot's compartment (not shown). One contact of the switch SW-3 is connected by a conductor 110 to an outside terminal of the motor 85 and the other contact is connected by a conductor 111 to the center terminal of the motor; the other outside terminal of the motor is connected by a conductor 112 to ground at G-2.

A switch SW-4 is the crash shield control switch. This switch is also located on one of the side walls 25 of the seat and preferably adjacent the switch SW-1. One contact of this switch is connected by a conductor 113 to the conductor 111 from the switch SW-3 to the center terminal of the motor 85; the other contact of this switch is connected by a conductor 114 to the conductor 110 from the switch SW-3 to one outside terminal of the motor 85; and the blade of the switch is connected by a conductor 115 to the conductor 105 from the switch SW-1 to the passenger responsive switch SW-2.

In operation, the motor 30 may be operated to recline the seat rearwardly, if the passenger desires greater comfort, and to return same to the substantially upright position. It can, of course, be likewise operated to recline the seat rearwardly, if the passenger should sense an impending crash landing, which the pilot is still trying to avert. It will be obvious that in the reclined position of the seat and with the body of the passenger closer to the floor, the passenger will be protected to a greater extent by the seat supporting structure 11—11 during a crash landing than when the seat is in the substantially upright position. The seat control switch SW-1 may be operated to close the circuit between the conductors 100 and 103. The circuit for the motor 30 is then completed over these conductors and conductor 101. The motor will be energized and the rack 34 will swing the seat rearwardly. Conversely, the switch SW-1 may be operated to close the circuit between the conductors 100 and 104. The circuit for the motor 30 is then completed over these conductors and conductor 101. The motor will again be energized but will run in the opposite direction and the rack gear 34 will swing the seat forwardly.

When the pilot believes that a crash landing is imminent, he can operate the switch SW-3 to close the circuit between conductors 109 and 111. If there is a passenger in the seat, the switch SW-2 will be closed. The circuit for the motor 85 will then be completed over the conductor 100. Over the conductor 105, through the switch SW-2 over the conductor 109 and the conductor 111 to the motor, and then over the conductor 112 to the ground G-2, ground G-1, and over the conductors 102 and 101. The motor 85 will be energized and, through the rack gear 84 and arms 72—72, will swing the crash shield 40 rearwardly, in the opposite direction to that shown by the arrow in FIG. 1, to the seat enclosing position. The crash shield will be releasably held in such position by the latches 51. The switch SW-2 provides that the crash shield 40 will not be swung to seat enclosing position, if the seat is not occupied. Conversely, after the crash landing has occurred or the danger of the same has passed, the pilot will operate the switch SW-3 to close the circuit between the conductors 109 and 111. The circuit for the motor 85 will then be completed over the conductor 100, conductor 105, through the switch SW-2, over the conductor 109, conductor 114 to ground at G-2, ground at G-1, and over conductors 102 and 101. The motor 85 will again be energized but will rotate in the opposite direction and will swing the crash shield 40 through the rack gear 84 and arms 72—72 in the direction shown by the arrow in FIG. 1, the crash shield being received in the recess in the forward seat supporting structure 11—11.

If the pilot should neglect for any reason, such as being preoccupied in trying to avert the crash landing, to operate the switch SW-3, the passenger may operate the switch SW-2. Operation of this switch in one direction will complete the circuit to energize the motor 85 and move the crash shield to seat enclosing position as follows; over the conductor 100, the conductor 105, the conductor 115, through the switch SW-3, over the conductor 113, and the conductor 111 to the motor 85, and then over the conductor 112 to the ground at G-2, the ground at G-1, and over the conductors 102 and 101. Conversely, if after the crash landing has occurred or the danger of same has passed, the pilot should fail to operate the switch SW-3, to energize the motor 85 and move the crash shield 40 to the normal position away from the seat, the passenger can operate the switch SW-4 in the opposite direction. The circuit for the motor 88 will then be completed as follows; over the conductor 100, the conductor 105, the conductor 115, through the switch SW-4, and over the conductor 114, to the conductor 110 and the motor 85, and then over the conductor 112, to the ground at G-2, the ground at G-1 and over the conductors 102 and 101.

In the event of a power failure, the passenger may operate the presser plate 82 with his foot to remove the rods 76—76 from the holes 45—45 in the side flanges 42—42 of the crash shield and free the latter for pivotal movement on the rod 26, as above described. The crash shield may then be moved by hand to the seat enclosing position. Also, if the crash shield 40 should be moved to the seat enclosing position either by the pilot operating the switch SW-3 or the passenger operating the switch SW-4, and a power failure should occur during a crash landing, the crash shield 40 could be freed for manual operation in the same manner and manually moved to its normal position within the recess in the forward seat supporting structure 11—11, so that the passenger may leave the seat. Whenever the crash shield 40 is freed for manual operation, the releasable mounting means frees the motor 85 so that the latter will not interfere with the manual operation. The rod 94 is withdrawn from the hole 93 in the block 91 and the motor 85, rack 84, rack gear housing 88 and arms 89 pivot freely around the bolts 90 through the lugs 17.

Having now fully described my invention, what I claim as new and useful and desire to secure by Letters Patent of the United States is:

1. A seat mounted in an airplane body having a pilot's compartment, a pivotal mounting, a crash shield swingably supported on said pivotal mounting and movable to a position in which it encloses the front of the seat, a reversible electric motor connected to said crash shield for moving same to and from the latter position, a control switch positioned in the pilot's compartment and connected in the energizing circuit of said electric motor for operating said crash shield to the position in which it encloses the front of the seat and in the opposite direction to a position in which it is spaced apart from the seat, and a switch positioned under the seat and responsive to the weight of a passenger in the latter connected in one side of the energizing circuit from the control switch to the motor.

2. A reclinable seat mounted in an airplane body, a pivotal mounting for said seat, a reversible electric motor connected to said seat for moving same from the upright to the reclined position, or vice versa, an energizing circuit for said motor, and a control switch connected in said energizing circuit for energizing said motor to selectively run in opposite directions, a crash shield, a pivotal mounting for said crash shield swingably supporting same for movement to a position in which it encloses the front of the seat, a reversible electric motor connected to said crash shield for moving same to and from the latter position, an energizing circuit for the latter reversible motor including the control switch for the reversible motor operating the seat, and a control switch connected to said latter energizing circuit for operating the second reversible motor to swing the crash shield to the position in which it encloses the front of the seat and in the opposite direction to a position in which it is spaced apart from the seat.

3. A reclinable seat mounted in an airplane body, a pivotal mounting for said seat, means for swinging said seat about said pivotal mounting from upright to reclined position and vice versa, and a crash shield mounted on said pivotal mounting swingable to a position in which it encloses the front of said seat.

4. A seat mounted in an airplane body, a pivotal mounting, a crash shield swingably mounted on said pivotal mounting and movable to a position in which it encloses the front of said seat, a motor for swinging said crash shield toward and away from said seat, a transmission between said motor and said crash shield, including arms on said pivotal mounting having sleeves at their outer ends oscillatable with the pivotal mounting, a link connected to one of said arms, a pair of rods respectively slidable in said sleeves and engageable with the crash shield for locking same to the pivotal mounting, and a presser plate between said rods and pivotally connected to the latter for withdrawing the rods from engagement with the crash shield and freeing the latter for swinging movement on the pivotal mounting.

5. A seat mounted in an airplane body, a pivotal mounting, a crash shield swingably supported on said pivotal mounting and movable to a position in which it encloses the front of the seat, a motor for swinging said crash shield toward and away from said seat, a transmission between said motor and crash shield including arms on said pivotal mounting oscillatable therewith, a link connected to one of said arms and operatively connected to said motor, releasable means for locking said arms to said crash shield, and a two point suspension for said motor including a support on which it is pivotally mounted and a support with which it is releasably engaged.

6. A reclining seat mounted in an airplane body, a pivotal mounting for said seat, a reversible motor connected to said seat for moving same from upright to reclined position, or vice versa, a crash shield swingably mounted on said pivotal mounting, and a reversible electric motor connected to said crash shield for moving same from a position spaced from said seat to a position enclosing the front of the seat, or vice versa.

7. A reclinable seat mounted in an airplane body having a pilot's compartment, a pivotal mounting for said seat, a first electric motor, a mechanical transmission between said electric motor and said seat for moving same from an upright to a reclined position, an energizing circuit for said first electric motor including a control switch positioned adjacent said seat, a crash shield swingably supported adjacent said seat and movable to a position in which it encloses the front of the seat, a pivotal mounting for said crash shield, a second electric motor, a mechanical transmission between said second electric motor and said crash shield for operating the crash shield to the position in which it encloses the front of the seat and in the opposite direction to a position in which it is spaced apart from the seat and an energizing circuit for said second electric motor including a control switch also positioned adjacent said seat.

8. A reclinable seat mounted in an airplane body having a pilot's compartment, a pivotal mounting for said seat, a first reversible electric motor, a mechanical transmission between said electric motor and said seat for moving same from an upright to a reclined position, an energizing circuit for said first electric motor, a control switch positioned adjacent said seat and connected in said energizing circuit for energizing said electric motor to selectively run in opposite directions, a crash shield swingably supported adjacent said seat and movable to a position in which it encloses the front of the seat, a pivotal mounting for said crash shield, a second reversible electric motor, a mechanical transmission between said second electric motor and said crash shield for operating the crash shield to the position in which it encloses the front of the seat and in the opposite direction to a position in which it is spaced apart from the seat, an energizing circuit for said second electric motor, and a control switch also positioned adjacent said seat and connected in said latter energizing circuit for energizing said second electric motor to selectively run in opposite directions.

9. A reclinable seat mounted in an airplane body having a pilot's compartment, a pivotal mounting for said seat, a first reversible electric motor, a mechanical transmission between said electric motor and said seat for moving same from an upright to a reclined position, an energizing circuit for said first electric motor including a control switch positioned adjacent said seat, a crash shield swingably supported on said pivotal mounting adjacent said seat and movable to a position in which it encloses the front of the seat and in the opposite direction to a position in which it is spaced apart from the seat, a second reversible electric motor connected to said shield and an energizing circuit for said second electric motor including a control switch also positioned adjacent said seat.

References Cited in the file of this patent

UNITED STATES PATENTS

| | | |
|---|---|---|
| 2,156,252 | Cichero | Apr. 25, 1939 |
| 2,433,950 | Henderson | Jan. 6, 1948 |
| 2,533,595 | Luketa | Dec. 12, 1950 |
| 2,733,027 | Gero | Jan. 31, 1956 |
| 2,820,602 | Foster | Jan. 21, 1958 |
| 2,833,554 | Ricordi | May 6, 1958 |
| 2,853,258 | Polleys | Sept. 23, 1958 |
| 2,924,265 | Himka | Feb. 9, 1960 |

FOREIGN PATENTS

| | | |
|---|---|---|
| 1,008,155 | France | Feb. 13, 1952 |